(12) United States Patent
Suisaka

(10) Patent No.: US 6,430,280 B1
(45) Date of Patent: Aug. 6, 2002

(54) TELEPHONE MAIN UNIT AND TELEPHONE CONTROL APPARATUS

(75) Inventor: Kazunori Suisaka, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 131 days.

(21) Appl. No.: 09/609,685

(22) Filed: Jul. 5, 2000

(30) Foreign Application Priority Data

Jul. 9, 1999 (JP) .......................................... 11-196127

(51) Int. Cl.⁷ .............................. H04M 1/00; H04M 9/00
(52) U.S. Cl. ........................ 379/162; 379/165; 379/393
(58) Field of Search ................................ 379/156, 157, 379/160, 162, 165, 166, 211, 212, 214, 393

(56) References Cited

U.S. PATENT DOCUMENTS 4,057,693 A * 11/1977 Angner et al. .............. 379/162
5,546,454 A * 8/1996 Harrington .................. 379/265

FOREIGN PATENT DOCUMENTS

| EP | 0 281 147 A2 | 4/1988 |
| JP | 56-50693 | 5/1981 |
| JP | 60-109364 | 6/1985 |

* cited by examiner

Primary Examiner—Binh Tieu
(74) Attorney, Agent, or Firm—Pearne & Gordon LLP

(57) ABSTRACT

A telephone main unit has a channel switch 11 which is connected to a remote telephone control apparatus 12 via a dedicated line 2; and central controlling means 12 for controlling the channel switch. When the central controlling means receives a hold request from a telephone set 4A connected to the channel switch, the central controlling means sends out to the dedicated line a pulse signal requesting holding in the remote telephone control apparatus, and ignores for a constant time period a pulse signal which is sent from the remote telephone control apparatus via the dedicated line.

6 Claims, 3 Drawing Sheets

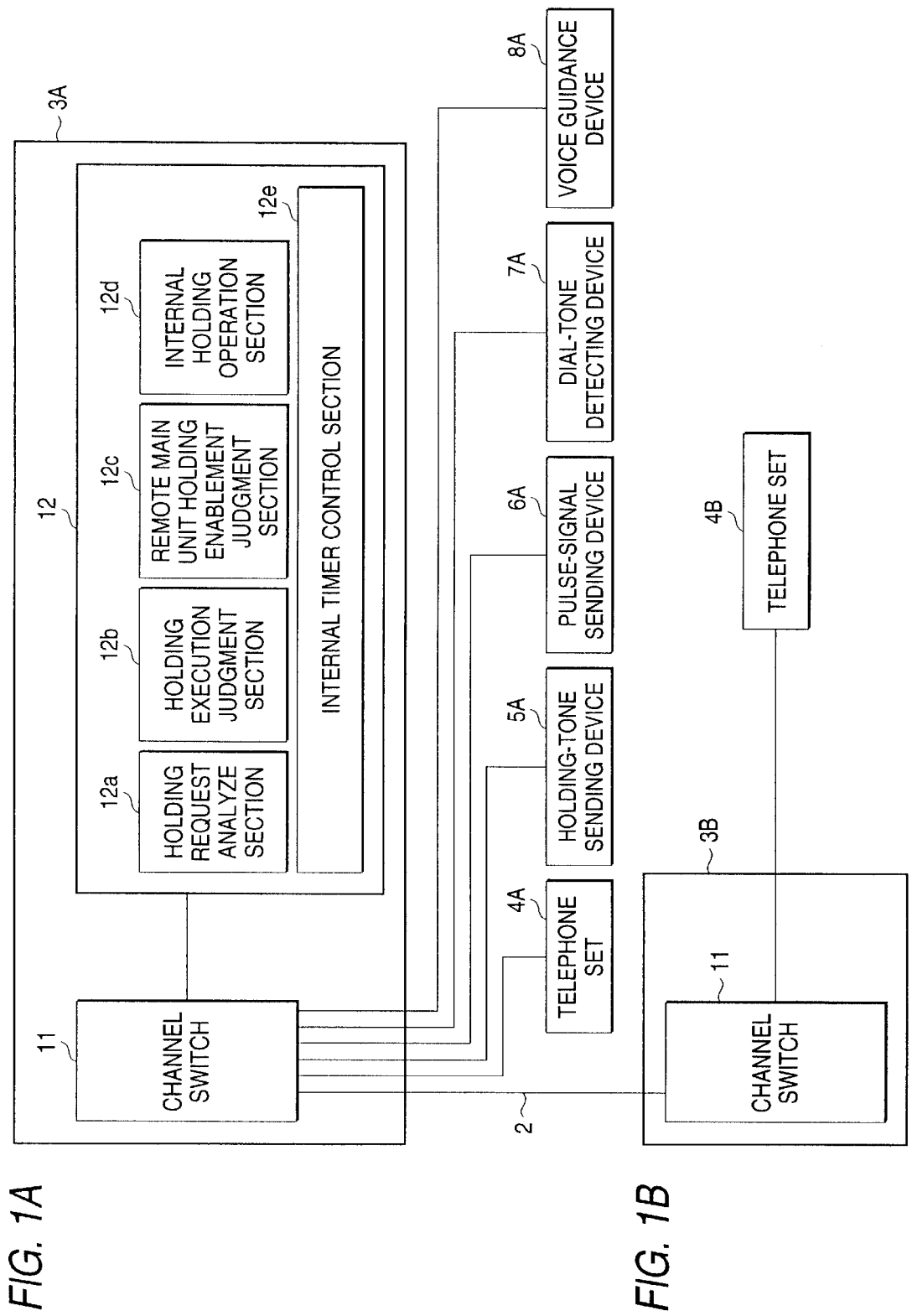

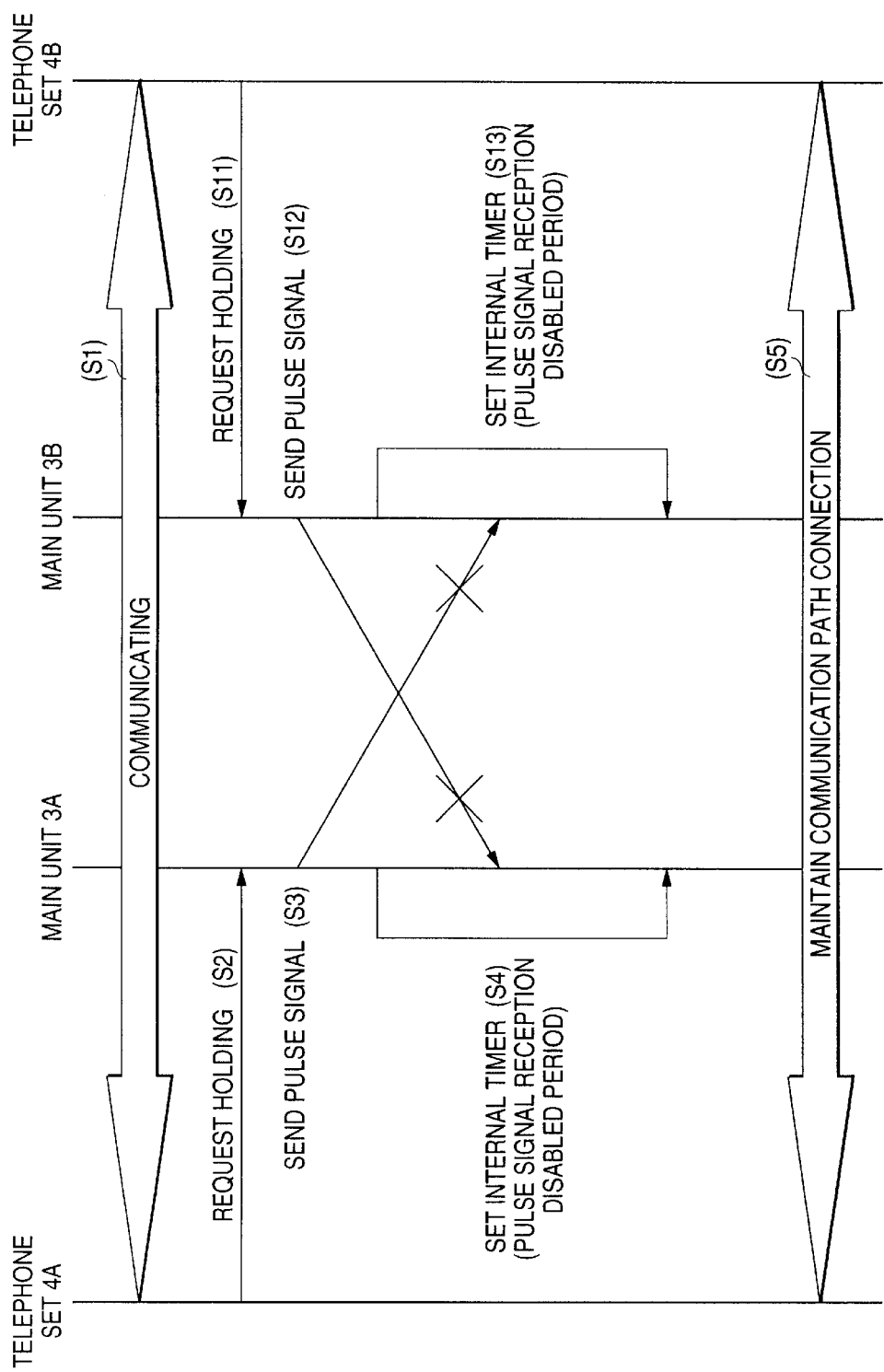

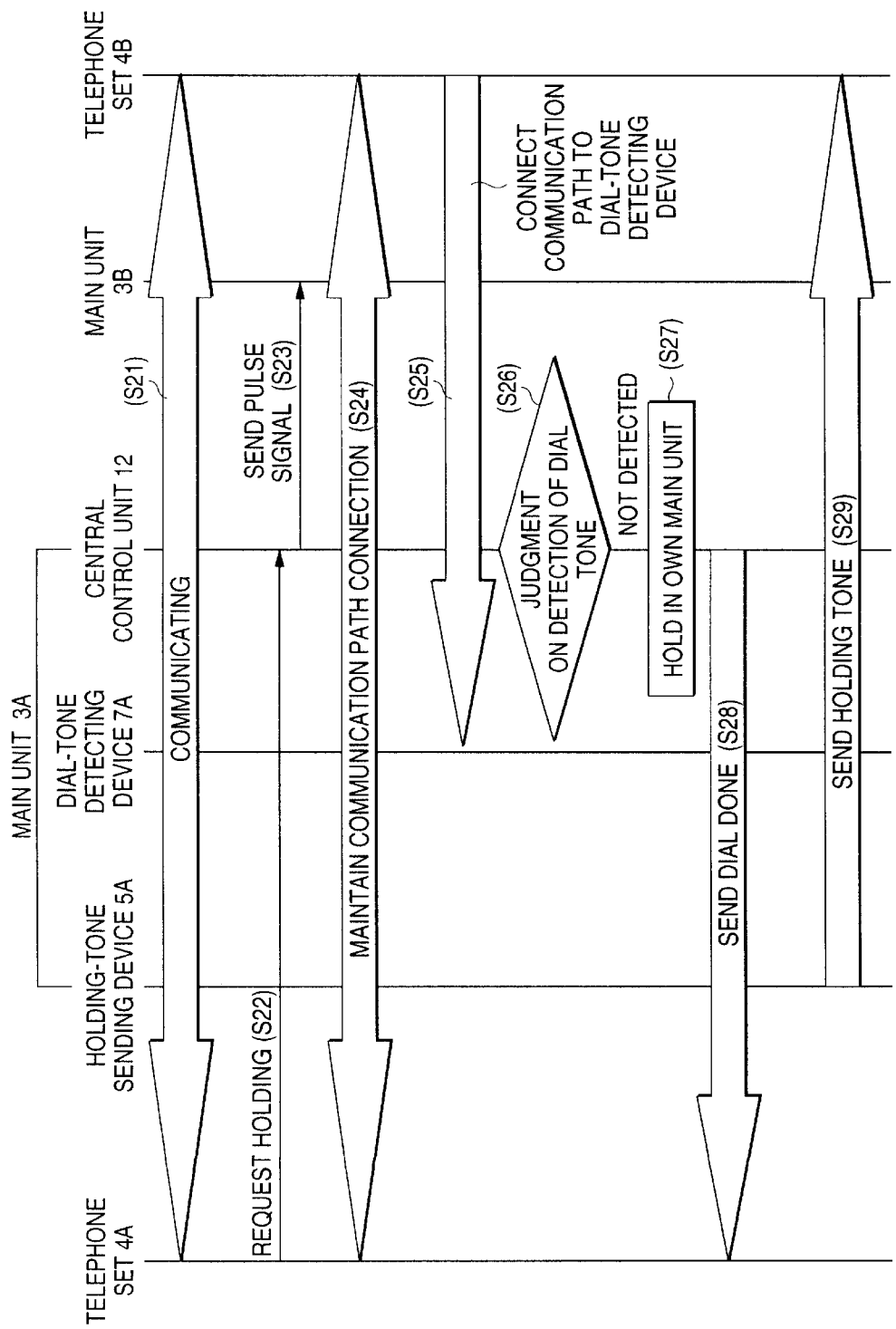

TELEPHONE MAIN UNIT AND TELEPHONE CONTROL APPARATUS

BACKGROUND OF THE INVENTION

The present invention relates to a main unit of a telephone system configured by connecting plural telephone control apparatuses together via dedicated lines, and also to a telephone control apparatus, and particularly to a main unit and a telephone control apparatus which have. a function of, when a holding operation is performed on a telephone set, requesting holding of a telephone control apparatus to which the remote telephone set belongs.

In a telephone system configured by connecting plural telephone control apparatuses together via dedicated lines, conventionally, when a telephone set which is communicated via one of the dedicated lines is to be held, a main unit to which a telephone set performing the holding operation belongs is held, another one of the dedicated. lines is seized, and a holding call is then transferred to a telephone set which belongs to another main unit set. Also after the transfer, therefore, two dedicated lines are occupied, and hence the resource of the dedicated lines cannot be effectively used.

A countermeasure against the above may be conducted in the following manner. When the holding operation is performed, a pulse signal is sent and received so that the telephone control apparatus to which the remote telephone set belongs is held, the transfer destination telephone set is called via a communication line, and the transfer operation is then performed. As a result, the dedicated lines are released, and the resource of the dedicated lines can be effectively used.

In the above-mentioned prior art in which holding is performed in a telephone control apparatus to which the remote telephone set belongs, when the holding operation is performed simultaneously in both communicating telephone sets, however, the pulse signals pass each other through the dedicated line, and both the telephone sets are held. As a result, the persons on both the telephone sides hear the holding tone, thereby producing a problem that the holding state cannot be cancelled.

SUMMARY OF THE INVENTION

The invention has been conducted in order to solve the problem of the prior art. It is an object of the invention to provide a main unit and a telephone control apparatus in which, even when the holding operation is performed simultaneously in both communicating telephone sets, both the telephone sets are prevented from entering the held state.

The main unit of the invention comprises: a channel switch which is connected to a remote telephone control apparatus via a dedicated line; and central controlling means for controlling the channel switch, and, when the central controlling means receives a hold request from a telephone set connected to the channel switch, the central controlling means sends out to the dedicated line a pulse signal requesting holding of the remote telephone control apparatus, and ignores for a constant time period a pulse signal which is sent from the remote telephone control apparatus via the dedicated line.

According to the invention, it is possible to obtain a main unit in which, even when the holding operation is performed simultaneously in both communicating telephone sets, both the telephone sets are prevented from entering the held state.

The main unit set of the invention comprises: a channel switch which is connected to a remote telephone control apparatus via a dedicated line; and central controlling means for controlling the channel switch, and, when the central controlling means receives a hold request from a telephone set connected to the channel switch, the central controlling means sends out to the dedicated line a pulse signal requesting holding of the remote telephone control apparatus, and ignores for a constant time period a pulse signal which is sent from the remote telephone control apparatus via the dedicated line. The main unit has a function of, even when two telephone sets connected together via a dedicated line simultaneously perform the holding operation and the pulse signals pass each other through the dedicated line, preventing both the telephone sets from entering the held state.

Preferably, if, when the central controlling means sends out the pulse signal to the remote telephone control apparatus, it is judged that holding of the remote telephone control apparatus is disabled, the central controlling means sets holding in an own side. The main unit has a function of, if holding of the telephone control apparatus to which the remote telephone set belongs cannot be performed, controlling the telephone control apparatus which is the source of the pulse signal, so as to automatically perform the holding operation.

Preferably, if it is judged that holding of the remote telephone control apparatus is disabled, the central controlling means connects a voice guidance device to the telephone set which produces the holding request. The main unit has a function of, if holding of the telephone control apparatus to which the remote telephone set belongs cannot be performed, notifying this situation to the person who has performed the holding operation.

Further, the telephone control apparatus of the invention comprises: a channel switch which is connected to a remote telephone control apparatus via a dedicated line; central controlling means for controlling the channel switch; a telephone set connected to the channel switch; and pulse signal sending means, connected to the channel switch, for, when the telephone set is held, sending out a pulse signal to the dedicated line to request holding of the remote telephone control apparatus, and, when the central controlling means receives a hold request from the telephone set, the central controlling means sends out the pulse signal, and ignores for a constant time period a pulse signal which is sent from the remote telephone control apparatus via the dedicated line. The telephone control apparatus has a function of, even when the holding operation is performed simultaneously in both telephone sets connected together via a dedicated line and the pulse signals pass each other through the dedicated line, preventing both the telephone sets from entering the held state.

Preferably, if, when the central controlling means sends out the pulse signal to the remote telephone control apparatus, it is judged that holding of the remote telephone control apparatus is disabled, the central controlling means sets holding in an own side. The telephone control apparatus has a function of, if holding of the telephone control apparatus to which the remote telephone set belongs cannot be performed, controlling the telephone control apparatus which is the source of the pulse signal, so as to automatically perform the holding operation.

Preferably, the telephone control apparatus set further comprises a voice guidance device which performs voice guidance, and, if it is judged that holding of the remote telephone control apparatus is disabled, the central controlling means connects the voice guidance device to the telephone set which produces the holding request. The telephone control apparatus has a function of, if holding of the telephone control apparatus to which the remote telephone set belongs cannot be performed, notifying this situation to the person who has performed the holding operation.

BRIEF DESCRIPTION OF THE DRAWINGS

FIG. 1 is a block diagram of a telephone system in which a main unit and a telephone control apparatus according to an embodiment of the invention are used;

FIG. 2 is a sequence diagram showing the operation of the invention; and

FIG. 3 is a sequence diagram showing the operation of the invention.

DETAILED DESCRIPTION OF THE PREFERRED EMBODIMENTS

Hereinafter, embodiments of the invention will be described with reference to the accompanying drawings.

Embodiment 1

FIG. 1 is a block diagram of a telephone system in which a main unit and a telephone control apparatus according to an embodiment of the invention are used, and shows a configuration in which telephone control apparatuses 1A and 1B are connected to each other via a dedicated line 2.

The telephone control apparatus 1A comprises: a main unit 3A; a telephone set 4A; a holding-tone sending device 5A; a pulse-signal sending device 6A which, when the telephone set 4A is held, generates a pulse signal requesting the remote telephone control apparatus 1B to perform holding, and sends out the pulse signal to the dedicated line 2; a dial-tone detecting device 7A which detects a dial tone; and a voice guidance device 8A which gives voice guidance to terminal devices.

The main unit 3A has a channel switch 11, and a central control unit 12 which switchingly connects the channel switch 11. The dedicated line 2, and the above-mentioned devices from the telephone set 4A to the voice guidance device 8A are connected to the channel switch 11.

The central control unit 12 has: a holding request analyze section 12a which detects a holding operation from any terminal device; a holding execution judgment section 12b which judges whether the holding operation is to be performed in response to a pulse signal received through the dedicated line 2 or not; a remote main unit holding enablement judgment section 12c which judges whether the telephone control apparatus 1B connected via the dedicated line 2 is enabled to perform holding or not; an internal holding operation section 12d which performs the holding operation in the own main unit 3A; and an internal timer control section 12e which is used for ignoring for a constant time period a pulse signal from the telephone control apparatus 1B.

The telephone control apparatus 1B is configured in the same manner. In FIG. 1, however, only a main unit 3B and a telephone set 4B are shown.

Next, referring to a sequence diagram of FIG. 2, the operation will be described which is conducted in the case where the telephone sets 4A and 4B simultaneously perform the holding operation during a period when, the telephone set 4A communicates with the telephone set 4B via the dedicated line 2.

During a period when the telephone sets 4A and 4B communicate with each other (step S1), the telephone set 4A performs the holding operation to notify the main unit 3A of the holding request (step S2). In the main unit 3A, the holding request analyze section 12a detects the holding request. If it is judged that the remote telephone set is connected via the dedicated line 2, the pulse-signal sending device 6A sends a pulse signal to the main unit 3B via the dedicated line 2 (step S3).

At the same time, the telephone set 4B performs the holding operation to notify the main unit 3B of the holding request (step S11). In the main unit 3B, the holding request analyze section 12a which is not shown detects the holding request. If it is judged that the remote telephone set is connected via the dedicated line 2, a pulse signal is sent to the main unit 3A via the dedicated line 2 (step S12).

At the timing when the pulse signal is sent out to the dedicated line 2, the main unit 3A requests the internal timer control section 12e to set a: timer (step S4). During a period when the timer is set, even if a pulse signal is received through the dedicated line 2, the pulse signal is not regarded as a signal requesting holding, and the communication state is maintained.

Similarly, at the timing when the pulse signal is sent out to the dedicated line 2, the main unit 3B requests the own internal timer control section 12e (not shown) to set a timer (step S13). During a period when the timer is set, even if a pulse signal is received through the dedicated line 2, the pulse signal is not regarded as a signal requesting holding, and the communication state is maintained (step S5).

In this way, even when the telephone sets 4A and 4B which communicate with each other via the dedicated line 2, the pulse signals through the dedicated line 2 are ignored during a certain fixed period after the pulse signals are sent out. Therefore, the communication state is maintained, and both the telephone sets 4A and 4B are prevented from simultaneously entering the held state.

Next, referring to a sequence diagram of FIG. 3, the operation will be described in which, in the case where the telephone sets 4A and 4B simultaneously perform the holding operation during a period when the telephone set 4A communicates with the telephone set 4B via the dedicated line 2 and it is judged that holding of the remote telephone set is disabled, the holding operation is automatically performed in the own main unit.

During a period when the telephone sets 4A and 4B communicate with each other (step S21), the telephone set 4A performs the holding operation, and notifies the main unit 3A of the holding request (step S22). In the main unit 3A, the holding request analyze section 12a then detects the holding request. If it is judged that the remote telephone set is connected via the dedicated line 2, the pulse signal is sent to the main unit 3B via the dedicated line 2 in the expectation that the main unit 3B performs holding (step S23).

While the communication path between the telephone sets 4A and 4B is maintained (step S24), the main unit 3A connects the reception from the dedicated line 2 to the dial-tone detecting device 7A (step S25).

If the main unit 3B receives the pulse signal and executes the holding operation, the main unit 3B sends out a dial tone to the dedicated line 2. If the dial-tone detecting device 7A detects the dial tone, the main unit 3A can regard that holding has been performed in the main unit 3B.

If the dial tone can be detected in a dial tone detection and judgment process (step S26), the communication path is disconnected from the dial-tone detecting device 7A and the process of the main unit 3A is then ended.

If the dial tone is not detected in the dial tone detection and judgment process, it is judged that holding by the main unit 3B is disabled, and the main unit 3A performs the holding operation (step S27). That is, a dial tone of an internal sound source of the main unit 3A is connected to the telephone set 4A (step S28), and the holding-tone sending device 5A is connected to the telephone set 4B (step S29).

As described above, even when the holding operation is performed simultaneously in the telephone sets 4A and 4B which are being communicated with each other via the dedicated line 2 and the holding operation is therefore disabled in the remote main unit, the holding operation can be automatically performed in the own main unit.

If it is judged that the dial tone is not detected in the dial tone detection and judgment process (step S26), the telephone set 4B is held by the main unit 3A, and the voice guidance device 8A is connected to the telephone set 4A.

The voice guidance device 8A notifies the user of the telephone set 4A that holding in the remote main unit 3B is disabled. The voice guidance device further notifies by means of voice guidance of functions which can be provided by the main unit 3A, such as those of retransmitting a flash signal so as to perform holding in the remote main unit 3B, or calling another telephone set. As a result, the user of the telephone set 4A can select one of the services by operating a dial key or the like.

As described above, even when the holding operation is performed simultaneously in the telephone sets 4A and 4B which are being communicated with each other via the dedicated line 2 and the holding operation is therefore disabled in the remote main unit, the operator can select the service to be next provided, in accordance with voice guidance.

According to the invention, in a telephone system configured by connecting plural telephone control apparatuses together via dedicated lines, even when holding is performed simultaneously in both telephone sets which are communicating with each other via the dedicated lines, it is possible to prevent pulse signals each requesting the remote telephone control apparatus to perform holding, from colliding, thereby attaining an advantageous effect that both the telephone sets are prevented from entering the held state.

What is claimed is:

1. A main unit wherein said main unit comprises:
    a channel switch which is connected to a remote telephone control apparatus via a dedicated line; and
    central controlling means for controlling said channel switch,
        wherein when said central controlling means receives a hold request from a telephone set connected to said channel switch, said central controlling means sends out to said dedicated line a pulse signal requesting holding of said remote telephone control apparatus, and ignores for a constant time period a pulse signal which is sent from said remote telephone control apparatus via said dedicated line.

2. A main unit according to claim 1, wherein, if, when said central controlling means sends out the pulse signal to said remote telephone control apparatus, it is judged that holding of said remote telephone control apparatus is disabled, said central controlling means sets holding in an own side.

3. A main unit according to claim 2, wherein, if it is judged that holding of said remote telephone control apparatus is disabled, said central controlling means connects a voice guidance device to said telephone set which produces the holding request.

4. A telephone control apparatus wherein said apparatus comprises:
    a channel switch which is connected to a remote telephone control apparatus via a dedicated line;
    central controlling means for controlling said channel switch;
    a telephone set connected to said channel switch; and
    pulse signal sending means, connected to said channel switch, for, when said telephone set is held, sending out a pulse signal to said dedicated line to request holding of said remote telephone control apparatus,
        wherein when said central controlling means receives a hold request from said telephone set, said central controlling means sends out the pulse signal, and ignores for a constant time period a pulse signal which is sent from said remote telephone control apparatus via said dedicated line.

5. A telephone control apparatus according to claim 4, wherein, if, when said central controlling means sends out the pulse signal to said remote telephone control apparatus, it is judged that holding of said remote telephone control apparatus is disabled, said central controlling means sets holding in an own side.

6. A telephone control apparatus according to claim 5 further comprising a voice guidance device which performs voice guidance, and,
    wherein if it is judged that holding of said remote telephone control apparatus is disabled, said central controlling means connects said voice guidance device to said telephone set which produces the holding request.

* * * * *